June 4, 1929.  S. W. VOLLINK  1,715,727
POWER UNIT
Filed Jan. 8, 1927   4 Sheets-Sheet 1
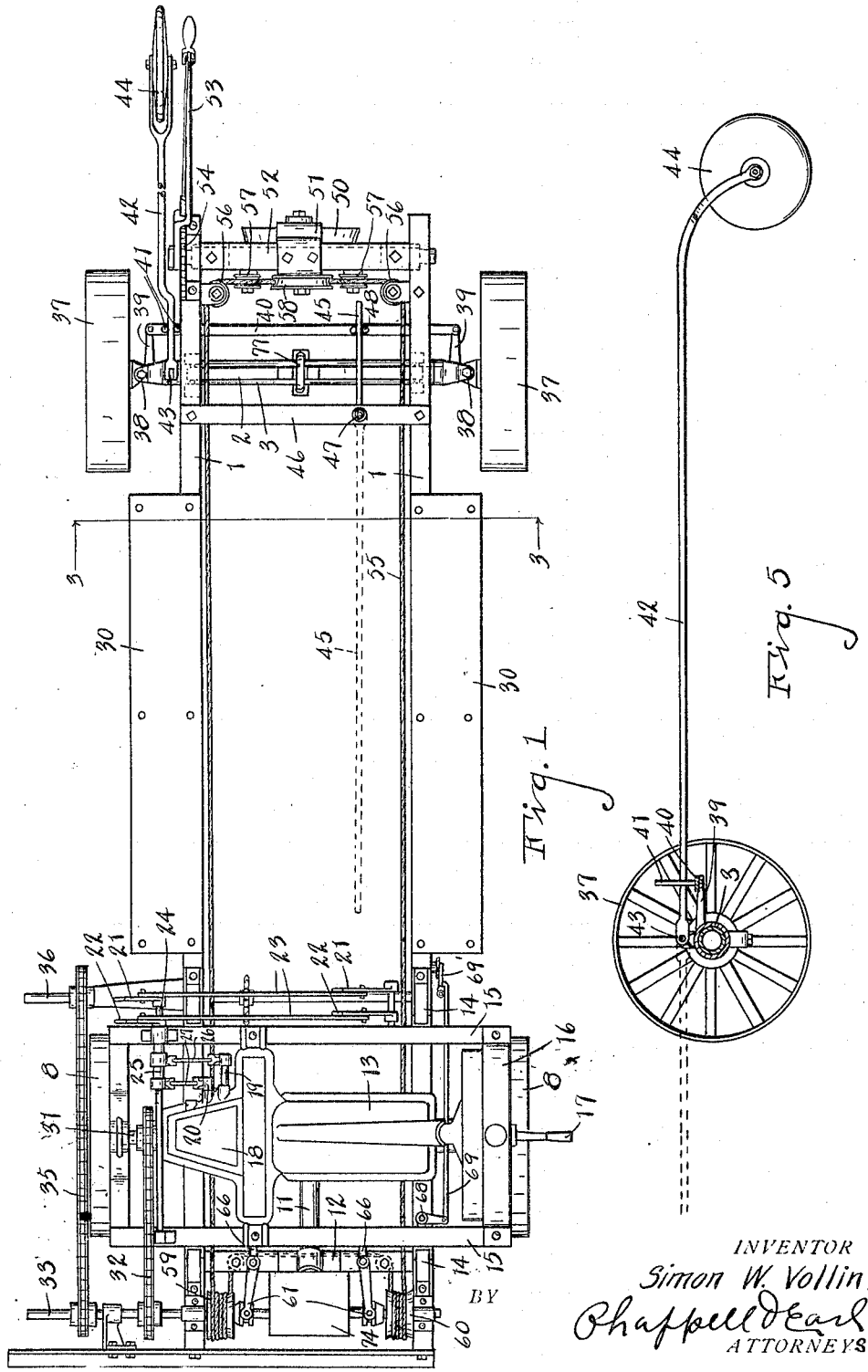
INVENTOR
Simon W. Vollink
BY
ATTORNEYS

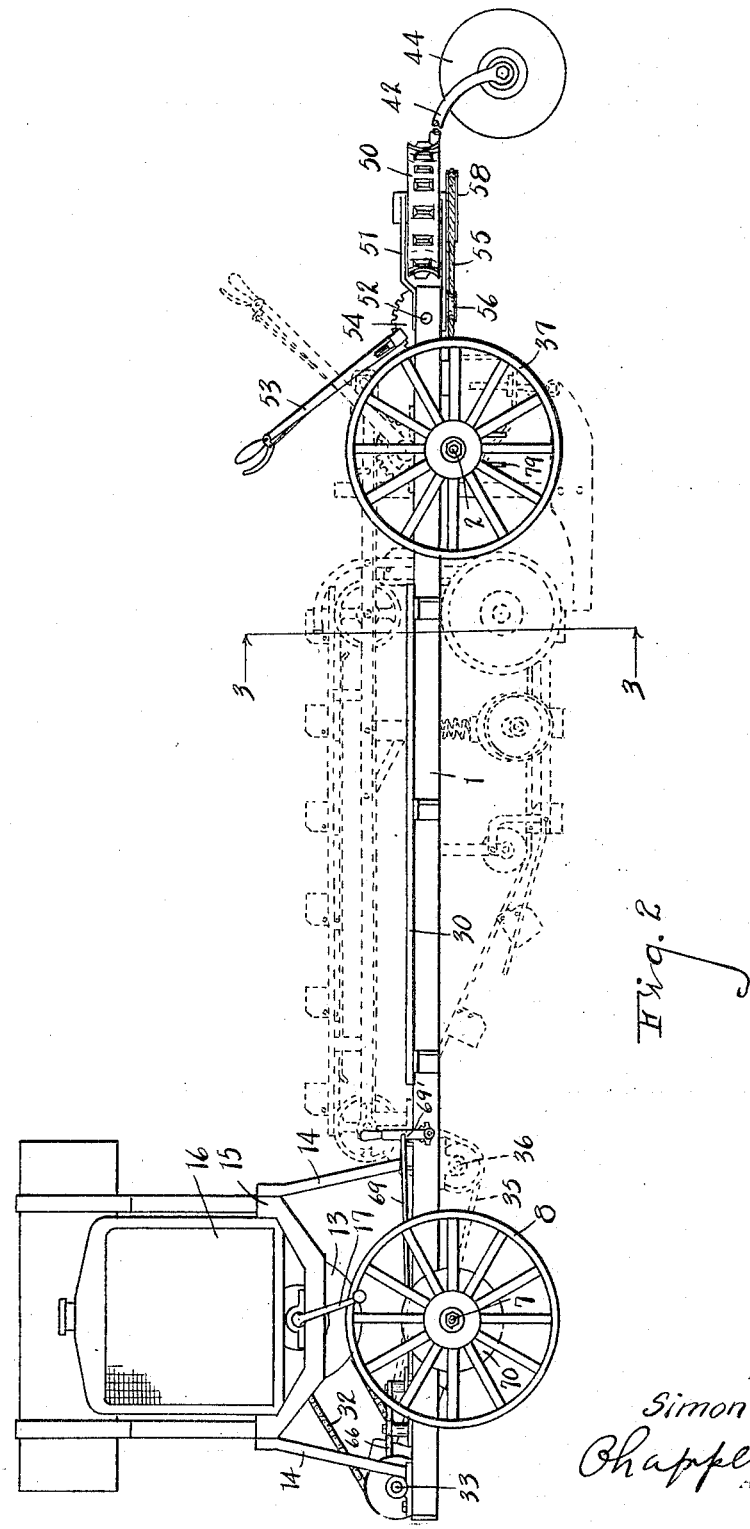

June 4, 1929.　　　　S. W. VOLLINK　　　　1,715,727
POWER UNIT
Filed Jan. 8, 1927　　　4 Sheets-Sheet 3
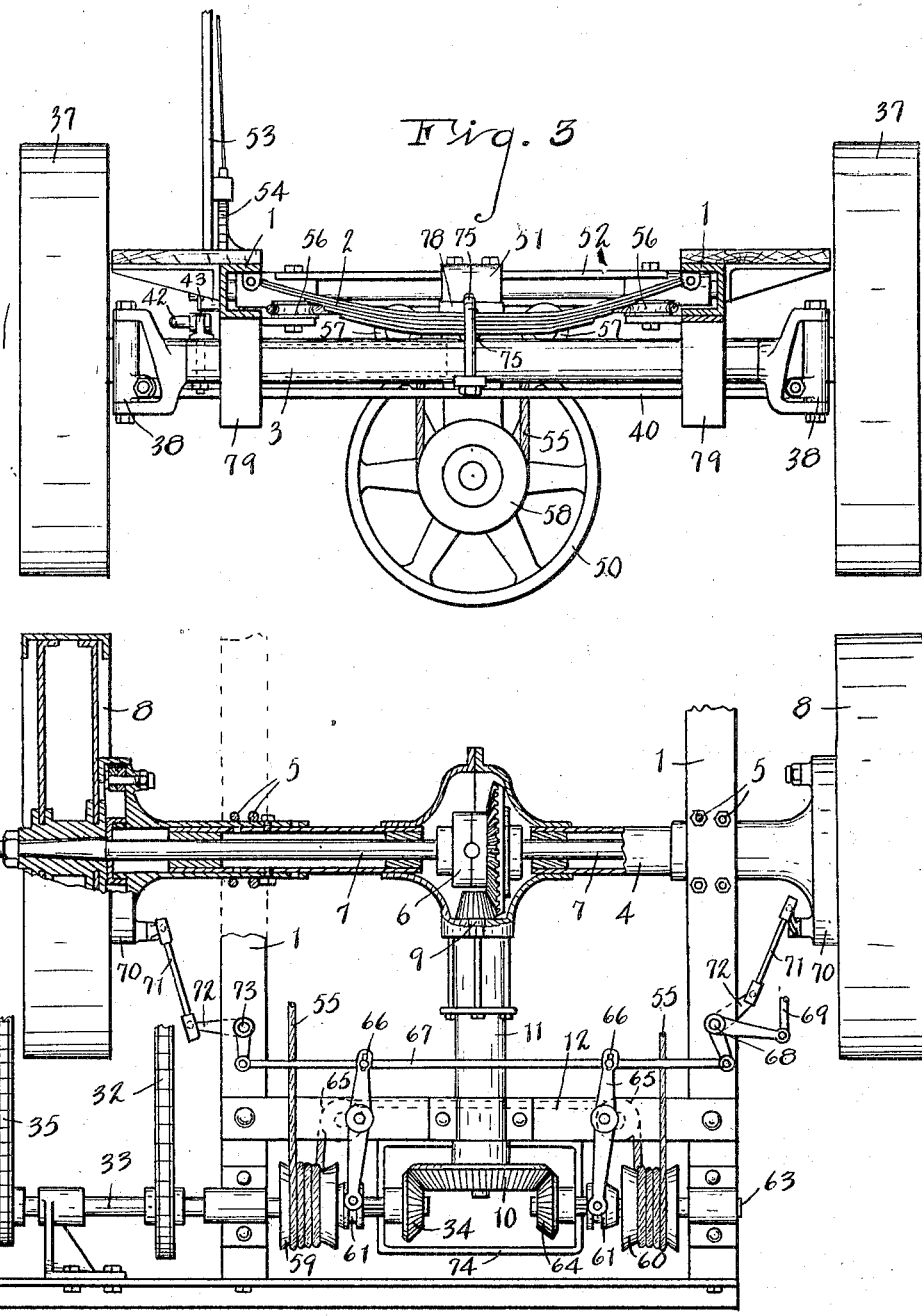
INVENTOR
Simon W. Vollink

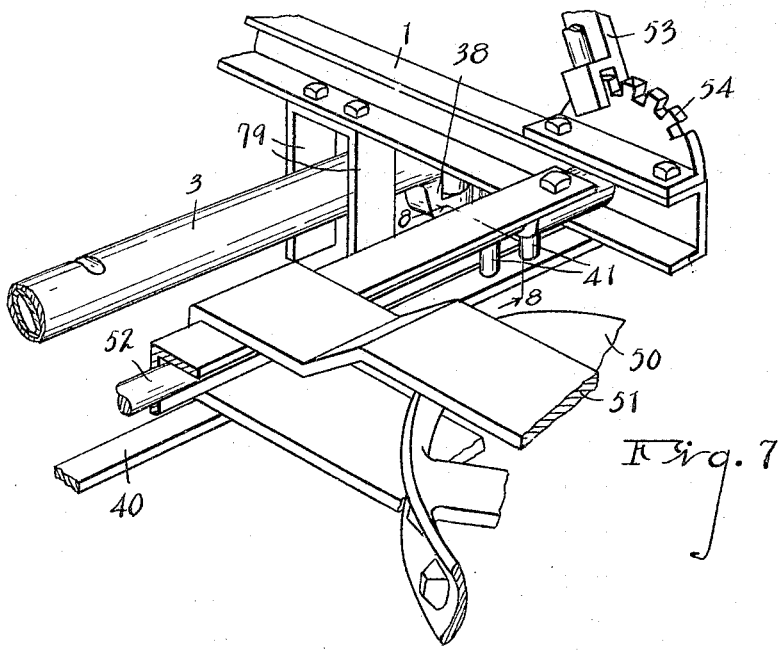
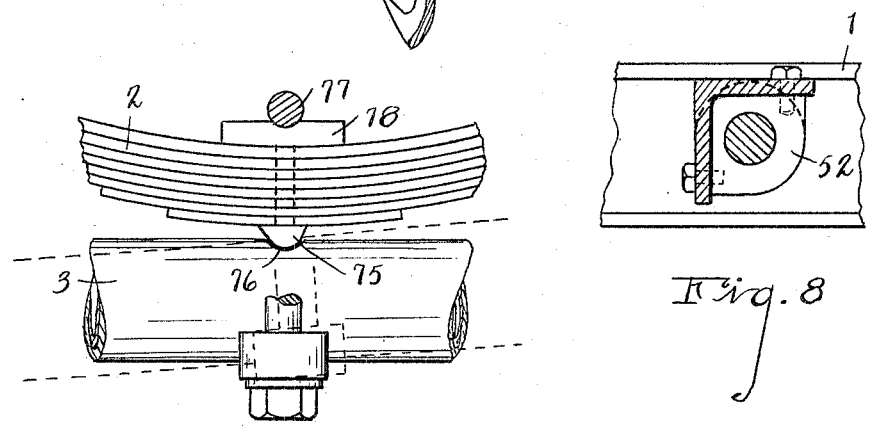
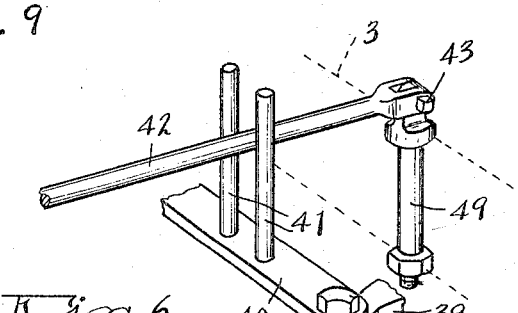

Patented June 4, 1929.

1,715,727

UNITED STATES PATENT OFFICE.

SIMON W. VOLLINK, OF HASTINGS, MICHIGAN.

POWER UNIT.

Application filed January 8, 1927. Serial No. 159,951.

The main objects of this invention are:

First, to provide an improved tractor for farm purposes which is adapted for a variety of uses, that is, various implements such as transplanters, cultivators and the like may be readily mounted thereon.

Second, to provide a farm tractor which is self-steering when used as a cultivator or transplanter and at the same time one which can be readily turned about in a relatively small space at the end of a row.

Third, to provide a structure of the class described which is easily controlled and may be driven at different speeds.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a plan view of the tractor without any implement attached thereto, the turning wheel being shown in position for swinging or turning the tractor and certain parts being omitted for convenience in illustration.

Fig. 2 is a side elevation, a transplanter unit such as shown in my application for Letters Patent filed concurrently herewith being shown by dotted lines. The turning wheel is here shown in inoperative position.

Fig. 3 is a transverse section on a line corresponding to line 3—3 of Figs. 1 and 2.

Fig. 4 is a fragmentary view partially in horizontal section showing details of the driving mechanism of the tractor.

Fig. 5 is a fragmentary view showing the details of the automatic steering means.

Fig. 6 is an enlarged fragmentary perspective of parts of the automatic steering means.

Fig. 7 is an enlarged fragmentary perspective showing details of the turning wheel.

Fig. 8 is a detail section on line 8—8 of Fig. 7.

Fig. 9 is a fragmentary detail showing the mounting for the front spring upon the front axle.

Referring to the drawing, I provide a chassis frame consisting of longitudinal sills 1, 1 connected by suitable cross members providing a rigid frame. This frame is supported by the front spring 2 mounted on the front axle 3. The rear ends of the longitudinal sills 1 are secured directly to the rear axle housing designated generally by the numeral 4 by means of the U-bolts or clips 5. The rear axle housing 4 is adapted to receive a differential designated generally by the numeral 6, see Fig. 4, the axle sections 7 being driven through the differential and suitably connected to the rear wheels 8.

The propeller shaft 9 projects rearwardly from the rear axle and has a beveled gear 10 on its rear end. The propeller shaft housing 11 is supported by a cross piece 12 connecting the sills 1.

The engine 13, a Ford automobile or truck engine being preferably employed, is mounted transversely of the machine above the rear axle, the engine being mounted on the brackets 14 carried by the longitudinal sills.

A sub-frame 15 for the engine is mounted on and carried by these brackets 14.

A radiator 16 is mounted at one end of this sub-frame and operatively associated with the engine.

17 represents the starting crank of the engine. 18 represents the transmission which is controlled from the rockshafts 19 and 20 which are connected from pairs of levers 21 and 22 disposed adjacent the sides of the machine and connected by the links 23. One of each pair of the levers 21 and 22 are mounted on rockshafts 24 and 25, respectively, which are connected to the transmission control shafts 19 and 20 by links 26 and 27. This enables the control of the transmission from either side of the machine.

Seats 30 are provided at the sides of the machine which are used when a transplanting attachment is mounted on the tractor as is indicated generally by dotted lines in Fig. 2. The transplanter is described in detail in my said copending application and is not further described herein.

The driving shaft 31 is connected by the sprocket chain 32 and suitable sprockets to the jackshaft 33 disposed at the rear of the rear axle. This jackshaft has a gear 34 meshing with the gear 10 on the propeller shaft, see Fig. 4.

This jackshaft is connected by the sprocket chain 35 and suitable sprockets to a transmission shaft 36 which is employed when the machine is adapted as a transplanting machine, or it may be used for the driving of other equipment mounted on the tractor.

The steering wheels 37 are mounted on a steering spindle connected to the front axle by the steering knuckles 38. These steering knuckles have forwardly projecting arms 39 connected by the connecting rod 40 disposed in front of the front axle. The steering knuckle connecting rod 40 is provided with a pair of upwardly projecting pins 41 between which the steering arm 42 pivoted at 43 on the axle may be engaged.

This steering arm carries a tracer wheel 44 at its outer end which is adapted to travel in a guiding furrow or the like formed for the purpose either by previously marking the ground or by the previous passing of the machine working on an adjacent row. The marking means is not illustrated herein.

For steering the machine by hand I provide a manually operated steering rod 45 pivoted on the cross piece 46 of the frame at 47 and projecting forwardly from the cross piece to engage between the pins 48 on the connecting rod 40. It will be observed that there is a long leverage on this steering lever so that the machine is easily guided manually as occasion requires.

The steering arm 42 is swung out of position when the machine is manually steered and is swung backwardly on its pivot 43. The pivot 43 is carried by a vertical swiveled pin 49 which swivels to permit the swiveling of the steering arm.

To aid in turning the machine in a relatively small space I provide a turning wheel 50 which is mounted on a standard 51, the standard being carried by a pivoted bar 52 extending between the longitudinal sills 1. This bar 52 is journaled in the sills 1 and is provided at one end with an adjusting lever 53. When the wheel is swung to its erected position the bar engages the top flange of the longitudinal sills, the sill constituting a stop or thrust member for the bar. A segment 54 is provided to coact with this lever 53 for holding the parts in adjusted position.

When the turning wheel is swung down to vertical or operative position its axis is disposed longitudinally of the frame and the front end of the frame is carried by this turning wheel instead of the steering wheels. The turning wheel is driven by the cable 55 which is guided by the pulleys 56 and 57 disposed at each side of a driven pulley 58 on the spindle of the turning wheel 50. These cables extend rearwardly to the drums 59 and 60, the drum 59 being mounted on the jackshaft 33 to be connected thereto by means of the clutch shown conventionally at 61. The drum 60 is mounted on a shaft 63 disposed in alinement with the shaft 33 and provided with a beveled pinion 64 coacting with the pinion 10 on the propeller shaft.

The cable 55 is a continuous cable having a few wraps around each drum to secure driving friction and passing between the drums over guide pulleys 65. The pulley 60 is connected to the shaft 63 through a clutch 61. These clutches are provided with shifting levers 66 connected by the link 67 so that the clutches are alternately engaged or disengaged, or both may be shifted to a neutral position.

The link 67 is actuated from a vertical rockshaft 68 which is connected by the link 69 to a hand lever 69'.

To further facilitate the steering I provide means for applying a brake to one of the driving wheels 8, the brake drums being shown at 70. The brakes are connected to the rockshaft 68 through the link 71 and arm 72 on the rockshaft 68, the opposite end of the link 69 being connected to an arm on the rockshaft 73 which is in turn connected to the brake of the other wheel by arm 72 and link 71 as described.

It will be observed that by this arrangement the brakes are alternately applied, that is, the brake of one wheel is applied and the other released simultaneously with the engaging and disengaging of corresponding clutches for the cable driving drums so that one of the driving wheels is held against rotation and the machine swung around on such wheel as a pivot.

The gears 34 and 64 are enclosed in a gear box 74. The front spring 2 is provided with a support 75 having rocking engagement with a bearing recess 76 in the front axle. The U bolt 77 is alined with the bearing recess 76 and engages a bearing block 78 permitting rocking movement of the axle relative to the frame.

To prevent the swiveling of the axle the frame is provided with downwardly projecting guiding forks 79 which embrace the axle permitting this rocking movement while keeping it in proper relative relation and preventing its swinging movement in a horizontal plane.

I have not attempted to show the various types of farm implements or the like that may be mounted on my improved tractor. The same is, however, adapted for cultivators, harrows, the transplanter of my copending application, and various other adaptations or uses.

Having thus described my invention what I claim as new and desire to secure by Letters Patent is:

1. In a motor vehicle, the combination of a chassis frame comprising longitudinal sills, a driving axle and differential assembly provided with a housing mounted on said sills, driving wheels provided with brakes, a propeller shaft provided with a housing extending rearwardly from said axle housing, a cross piece on said chassis frame on which the rear end of said propeller shaft is mounted, a sub-frame mounted transversely of the chassis frame above said rear axle housing, an engine provided with a transmission disposed on said sub-frame above said axle housing with its shaft transversely of the chassis frame, a jackshaft mounted on said chassis frame at the rear of said axle, coacting gears on said jackshaft and propeller shaft, driving connections from said engine transmission to said jackshaft, a turning wheel provided with a pulley, a turning wheel standard pivotally mounted on said frame, the pivot axis of said standard being transverse of the chassis frame whereby the turning wheel may be swung into operative position to lift the front wheels from the ground, an endless driving cable for said pulley, a pair of driving drums for said cable, one of said drums being mounted on said jackshaft, a shaft for the other drum axially alined with said jackshaft and provided with a gear meshing with the gear on said propeller shaft whereby the drum shaft is driven in the opposite direction from the jackshaft, supporting and guiding pulleys for said driving cable, clutches for connecting said drums to their shafts, and means for controlling said brakes and clutches whereby corresponding brakes and clutches may be simultaneously engaged.

2. In a motor vehicle, the combination of a chassis frame comprising longitudinal sills, a driving axle and differential assembly provided with a housing mounted on said sills, driving wheels, a propeller shaft provided with a housing extending rearwardly from said axle housing, a cross piece on said chassis frame on which the rear end of said propeller shaft is mounted, a sub-frame mounted transversely of the chassis frame above said rear axle housing, an engine disposed on said sub-frame above said axle housing with its shaft transversely of the chassis frame, a jackshaft mounted on said chassis frame at the rear of said axle, coacting gears on said jackshaft and propeller shaft, and driving connections from said engine to said jackshaft.

3. In a motor vehicle, the combination of a chassis frame comprising longitudinal sills, a driving axle and differential assembly provided with a housing mounted on said sills, driving wheels, a propeller shaft provided with a housing extending rearwardly from said axle housing, a cross piece on said chassis frame on which the rear end of said propeller shaft is mounted, a sub-frame mounted transversely of the chassis frame above said rear axle housing, an engine provided with a transmission disposed on said sub-frame above said axle housing with its shaft transversely of the chassis frame, a jackshaft mounted on said chassis frame at the rear of said axle, coacting gears on said jackshaft and propeller shaft, driving connections from said engine transmission to said jackshaft, a front axle provided with steering spindles, and steering wheels on said front axle spindles.

4. In a motor vehicle, the combination of a chassis frame, a driving axle and differential assembly provided with a housing mounted on said chassis frame, driving wheels on said axle provided with brakes, a propeller shaft provided with a housing extending rearwardly from said axle housing, an engine provided with a transmission mounted transversely of the frame above said axle, a jackshaft mounted on said chassis frame at the rear of said axle, coacting gears on said jackshaft and propeller shaft, driving connections from said engine transmission to said jackshaft, a turning wheel provided with a pulley, an endless driving cable for said pulley, a pair of driving drums for said cable, one of said drums being mounted on said jackshaft, a shaft for the other drum axially alined with said jackshaft and provided with a gear meshing with the gear on said propeller shaft whereby the drum shaft is driven in the opposite direction from the jackshaft, supporting and guiding pulleys for said driving cable, clutches for connecting said drums to their shafts, and means for controlling said brakes and clutches whereby corresponding brakes and clutches may be simultaneously engaged and disengaged.

In witness whereof I have hereunto set my hand.

SIMON W. VOLLINK.